United States Patent
Leeper et al.

(10) Patent No.: US 6,746,736 B2
(45) Date of Patent: Jun. 8, 2004

(54) OIL AND GREASE RESISTANT COATING COMPOSITION

(75) Inventors: Timothy Jon Leeper, Greensboro, NC (US); Joy Michelle Thomas, Burlington, NC (US)

(73) Assignee: Actinic, Inc., Greensboro, NC (US)

( * ) Notice: Subject to any disclaimer, the term of this patent is extended or adjusted under 35 U.S.C. 154(b) by 0 days.

(21) Appl. No.: 09/798,180

(22) Filed: Mar. 2, 2001

(65) Prior Publication Data

US 2002/0164440 A1 Nov. 7, 2002

(51) Int. Cl.$^7$ .................. B29D 22/00; B29D 23/00; B32B 21/08; B32B 9/06; B32B 23/08

(52) U.S. Cl. .................. 428/34.3; 428/34.2; 428/479.6; 428/485; 428/486; 428/511; 428/534; 428/535; 428/537.5

(58) Field of Search ................. 428/34.3, 35.2, 428/34.2, 486, 537.5, 479.6, 511, 532, 485, 534, 535; 383/205, 113; 206/459.5, 524.2

(56) References Cited

U.S. PATENT DOCUMENTS

| | | | | |
|---|---|---|---|---|
| 3,664,987 A | * | 5/1972 | Moyer et al. | 260/29.6 H |
| 3,811,933 A | * | 5/1974 | Uffner et al. | 117/155 |
| 4,227,979 A | * | 10/1980 | Humke et al. | 428/447 |
| 5,006,405 A | * | 4/1991 | Watkins et al. | 428/323 |
| 5,035,946 A | * | 7/1991 | Baker et al. | 428/327 |
| 6,003,670 A | * | 12/1999 | Beer | 206/459.5 |
| 6,140,386 A | * | 10/2000 | Vanderhoff et al. | 101/491 |
| 6,328,471 B1 | * | 12/2001 | Culbertson | 383/109 |
| 6,338,572 B1 | * | 1/2002 | Schneck | 383/205 |

* cited by examiner

*Primary Examiner*—Harold Pyon
*Assistant Examiner*—Catherine A. Simone
(74) *Attorney, Agent, or Firm*—Womble Carlyle Sandridge & Rice, PLLC

(57) ABSTRACT

The present invention is a composition for use as an oil and grease resistant coating for packaging materials including a radiation sensitive monomer; a photopolymerization initiator; and an additive, wherein the additive preferably is a chlorinated paraffin. Preferably, the composition is used to treat the surface of a paper or paperboard substrate and the substrate preferably is used subsequently in the manufacture of packaging materials, such as pet food bags.

7 Claims, 1 Drawing Sheet

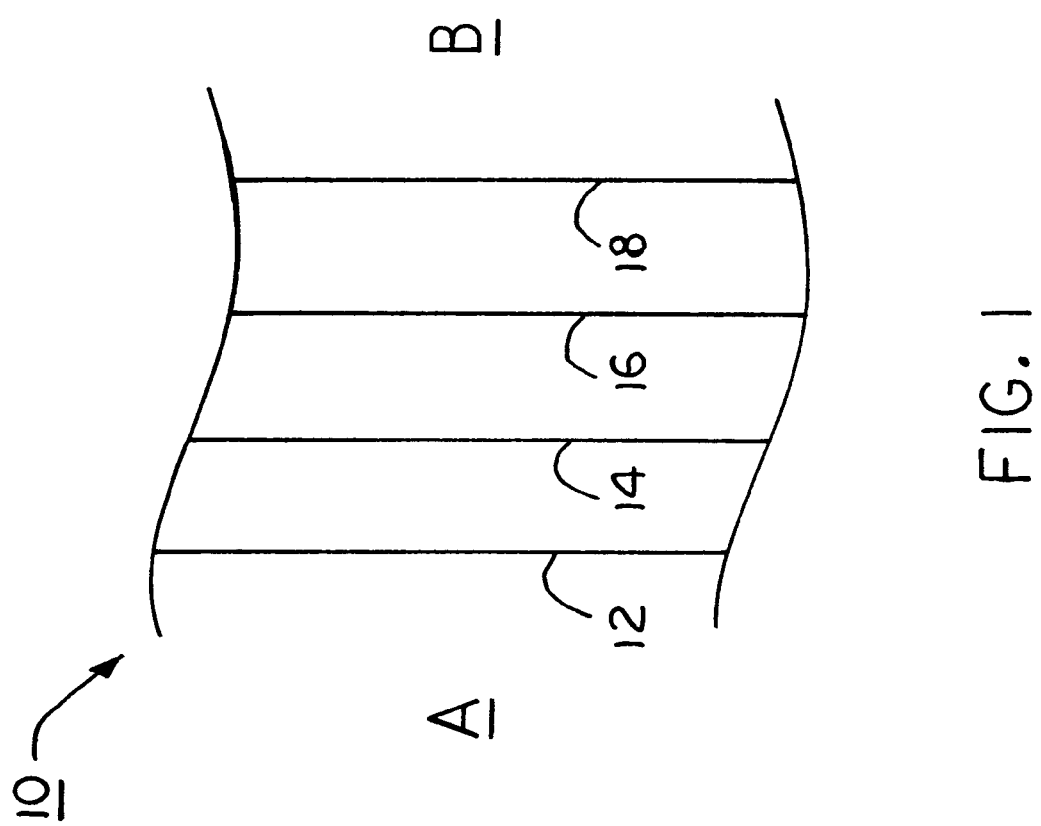

OIL AND GREASE RESISTANT COATING COMPOSITION

FIELD OF THE INVENTION

The present invention generally relates to UV curable coatings and more specifically to UV-curable coatings having improved oil and grease resistance that are particularly suited, without limitation, to packaging materials.

BACKGROUND OF THE INVENTION

Fluorochemicals as coatings or finishes for paper substrates generally exhibit three useful characteristics, namely, water repellency, oil and grease repellency and soil resistance. Emphasis can be placed on selected ones of these features by changing the chemistry in the fluorochemical used. However, when the amount of one property is increased, there usually is a corresponding reduction in emphasis on the other properties. Therefore, fluorochemicals are not a single product but a family of products designed for specific end-uses. Heretofore, fluorochemicals were thought to be the only finishing treatment that provides the optimum balance of these three characteristics to suit the end-use.

3M is a well-known manufacturer in the fluorochemical coating industry. Recently, 3M announced it is phasing out of some fluorine-related chemistry used to produce certain repellents and surfactant products. The affected product lines represent about two percent of 3M's nearly $16 billion in annual sales. More specifically, these products include a popular line of coatings used for oil and grease resistance on paper packaging, such as, for example, pet food bags and paper cartons.

While this chemistry has been used effectively for more than 40 years and the products generally are regarded as safe, the decision to phase out production is based on principles of responsible environmental management. Sophisticated testing capabilities, some developed in only the last few years, show that persistent by-product compounds from the fluorochemicals can be detected in the environment and in people.

With the imposition of environmental and health risks and the phase-out of 3M products, alternatives to fluorochemicals, especially in the field of coatings used for oil and grease resistance on paper packaging, are needed.

SUMMARY OF THE INVENTION

According to the present invention the varnish, which was conventionally applied over the previous fluoropolymer, now has a non-flourinated, oil and grease resistant additive, preferably a chlorinated paraffin incorporated therein. The chlorinated paraffin serves as an oil and grease resistant agent in the varnish coating for paper packaging materials. The chlorinated paraffin provides oil and grease resistance while maintaining an appropriate viscosity for the composition.

Thus the present invention is an improved over print varnish (OPV) and a paper and paperboard packaging treatment that provides oil and grease resistant properties. Preferably, the composition is used to treat the surface of a paper substrate, the substrate being used in the manufacture of packaging materials containing oily and greasy products, for example pet food bags.

Another aspect of the invention is an oil and grease resistant composition primarily made up of a chlorinated paraffin solubalized in a varnish.

These and other aspects of the present invention as disclosed herein will become apparent to those skilled in the art after a reading of the following description of the preferred embodiments. The description is for the purpose of describing a preferred embodiment of the invention and is not intended to limit the present invention.

BRIEF DESCRIPTION OF THE DRAWINGS

FIG. 1 is a schematic view of the present invention, illustrated within one embodiment of packaging material.

DETAILED DESCRIPTION OF THE PREFERRED EMBODIMENT

The present invention is a composition, particularly useful for packaging materials. While any appropriate packaging materials may be treated, as illustrated in FIG. 1, paper substrates such as pet food bags are a preferred end-product for the composition of the present invention. More specifically, dog food bags are particularly preferred product for use with the present invention.

A pet food bag 10 generally is formed of several layers of varying weight kraft paper. As used herein, kraft paper is defined as a tough, usually brown, paper made from wood pulp treated with a solution of sodium sulfate, and used chiefly for bags and other packaging products. Although one particular embodiment for a pet food bag is illustrated, such should not be used to limit the scope of the invention. As illustrated, the pet food, as a source of oil and grease from the inside, is maintained within the bag at point A. Point B represents the outside of the bag 10, which is exposed to a variety of sources of oil and grease from outside sources.

First layer 12 represents a plastic liner. The liner 12 may be heat sealable or non-heat sealable, as those skilled in the art will appreciate. Preferably, the first layer 12 is 0.75 gauge poly liner.

The use of a liner 12 is optional. Most preferably, the composite pet food bag 10 is made stronger to avoid the need for liner 12 due to its tendency to become poked through and torn by the edges of the pet food within the bag 10.

The liner 12 may be laminated to second layer 14. Second layer 14 may be 40# to 60# converting or multi-wall kraft paper. Preferably, second layer may be a 41# kraft paper such as that sold by South African Paper Packaging, Inc. ("SAPPI") of Braamfontein, Johannesburg, South Africa, or Crown Vantage of Cincinnati, Ohio.

Layer 14 is followed by a third layer 16. Third layer may be 40# to 60# converting or multi-wall kraft paper. Preferably, third layer is a 40# kraft paper such as that sold by SAPPI or Crown Vantage.

Lastly, a fourth layer 18 completes the bag 10 structure. Fourth layer 18 preferably is a 41# kraft paper as well, such as that sold by S. D. Warren, or its parent company, SAPPI. Layer 18 is treated to provide for the graphics and printing to be placed upon the packaging 10. Most preferably, layer 18 is bleached, one-side-clay-coated kraft paper as is known in the art. Generally, layer 18 is bleached, printed, and treated with an over-print varnish (OPV) such as ACT-75A, sold by Actinic, Inc. of Greensboro, N.C. The OPV composition must meet certain standards for use as a packaging material coating. Namely, as is known in the art, the composition must provide high (0.55–0.80) slide, (have a gloss of more than 60 as measured by a gloss meter,) and have a MEK rub resistance of more than 10, each of which are measurable by those skilled in the art.

Heretofore, prior to treatment with the OPV, layer 18 was coated with an additional oil and grease resistant coating such as SCOTCHBAN FC-845 ("FC-845") sold by 3M, Inc. of Minneapolis, Minn. As an example, FC-845 is a fluorochemical, more specifically, a water-based version of SCOTCHBAN FC-807 protector, i.e. no isopropyl alcohol.

As noted hereinabove, 3M is discontinuing production and sale of certain flurorchemical lines, including FC-845. Thus, an alternative oil and grease resistant coating is needed. Further, as currently manufactured, the packing material 10 is treated twice, once with the fluorochemical oil and grease resistant coating and then again with the OPV.

The present invention, on the other hand, provides an improved OPV composition that is processable through current manufacturing standards and serves as a single coating for paper substrates providing both the OPV and oil and grease resistant descried properties. In this manner, the present invention presents a more cost-effective product than was heretofore available because double coating (and requisite production costs thereof) are no longer necessary. Further, the raw materials used to prepare the present invention should provide some cost savings as compared to the raw materials, e.g. fluorochemicals, used in the prior art.

The composition of the present invention may be used as a coating upon any of the aforementioned paper substrate layers 14, 16, 18 or a combination thereof. In other words, the present composition need not necessarily be limited only to the outermost substrate 18. As shown through comparative testing results below, the single coating of the present invention, ACT-OGR, alone, provides oil- and grease-resistance similar to or better than the dual-coated product with both 3M-based FC-845 and ACT-75A OPV.

The composition of the present invention is a combination of several components, the specific combination being a leading aspect of the present invention. The composition is cured upon proper exposure to ultraviolet (UV) radiation. Any suitable source of ultraviolet light having a wavelength range of 200 to 400 nanometers may be used to cure the composition of the invention. Any of the known sources of UV light are suitable, such as mercury arcs, carbon arcs, swirl-flow plasma arcs, low pressure mercury lamps, iron-doped lamps, medium pressure mercury lamps, high pressure mercury lamps, UV emitting diodes, microwave-driven UV, electron beam lamps, and/or thermal peroxide curing.

The composition contains an OPV, such as ACT-75A, modified with the addition of a non-fluorinated, oil and grease resistant additive. More specifically, the preferred composition contains: (a) a radiation sensitive monomer or mixture of monomers; (b) a photoinitiator; (c) an antioxidant; and (d) a chlorinated paraffin.

The composition may include additional ingredients, such as coloring agents, defoamers, silica, diluents, or any other desired ingredient. A preferred composition includes a whitener, a defoamer, and silica. More preferably, the whitener is present in an amount of about 0% to about 10% by weight, most preferably about 8.57% by weight. The defoamer is preferably a hydrocarbon or silicone-based defoamer and is present in an amount of about 0% to about 10% by weight, most preferably about 0.10% by weight. The silica preferably is silane treated and is present in an amount of about 0.25% to about 5% by weight, most preferably about 0.75% by weight.

Component (a), the radiation sensitive monomer, preferably is present in the composition from about 20% to about 90% by weight, most preferably about 57.33% by weight. Examples, not meant to limit the invention, of preferred radiation sensitive monomers include acrylic or methacrylic esters such as ethylene glycol di(meth)acrylate, diethylene glycol di(meth)acrylate, tetraethylene glycol di(meth)acrylate, glycerol di(meth)acrylate, glycerol tri(meth)acrylate, 1,3-propylene glycol di(meth)acrylate, 1,2,4-butanertriol tri(meth)acrylate, 1,4-cyclohexanediol di(meth)acrylate, 1,4-benzenediol di(meth)acrylate, pentaerythritol tetra(meth)acrylate, 1,5-pentanediol di(meth)acrylate, trimethylolpropane tri(meth)acrylate, triproproxy di(meth)acrylate, and isobornylacrylate hexane diol (meth)diacrylate.

Additionally, acrylic or methacrylic amides such as N,N-bis(beta-hydroxyethyl) (meth)acrylamide, methylene bis(meth)acrylamide, 1,6-hexamethylene bis(meth)acrylamide, diethylenetriamine bis(meth)acrylamide, diethylenetriamine tris(meth)acrylamide, bis(gamma-(meth)acrylamidepropoxy)ethane and beta-(meth)acrylamide ethylacrylate; and vinyl monomers such as divinyl benzene may be used.

Wherever used herein "(meth)acrylate" is intended to refer to the respective compound having acrylate functionality and/or the respective compound having methacrylate functionality.

Component (b) is a photoinitiator (which phrase is used herein and should be interpreted to include to photopolymerization initiators and sensitizers), generally present in the composition from about 1% to about 20% by weight, most preferably about 6.87% by weight. The term "initiator" is used herein in a broad sense, in that it is a composition, which under appropriate conditions, will result in the polymerization of a monomer. Thus, materials for initiation may be photoinitiators, chemical initiators, thermal initiators, photosensitizers, co-catalysts, chain transfer agents, and radical transfer agents. Although photoinitiators and photosensitizers generally are known in the art, examples of preferred photoinitiators include triethylamine, isopropylthioxanthone, isobutyl benzoin ether, butyl benzoin ether, diethoxyacetophenone, and dimethoxyacetophenone. Examples of photosensitizers include benzophenone, anthraquinone, and thioxanthone. Blends of different photoinitiators, or photoinitiators and photosensitizers, can be used.

Component (c) is an antioxidant, preferably a phenolic antioxidant, more preferably a hydroquinone, most preferably butylated hydroxy toluene or (BHT). As those skilled in the art will appreciate, the antioxidant is added in an amount respective to the amount of component (d). Component (d) of the present invention is an additive, preferably a chlorinated paraffin. Although chlorinated paraffins are preferred, the present invention includes as component (d) an additive, such as any solid synthetic wax that contributes oil and grease resistant properties to the overall composition, as described in more detail below, while still displaying good solubility and viscosity-to-load performance. For example, an additive useful for the present invention will exhibit a viscosity of between 200–1,000 cP in order to be applied with current processing equipment. The current processing systems for coating paper and paperboard substrates operate under high speeds, thus requiring a sufficiently low viscosity for the coating composition. Most preferably, the formulation of the present invention maintains a viscosity of 200–1,000 cP at 50% loading and, more preferably, at even higher loading values.

For example, chlorinated polyolefins are not an acceptable additive due to poor solubility in the overall formulation. Chlorinated polyolefins used as an additive in the present invention likely would provide a formulation with a viscosity of 20,000 cP or more at a low load, such as 5%. As such, chlorinated polyolefins are an example of an additive that may not be used with the present invention.

Preferably, the additive is present in the composition from about 5% to about 40% by weight, most preferably about 20.00% by weight. As stated, chlorinated paraffins, especially those ranging in molecular weight from 350 to 1,200, are preferred additives for the present invention. Further, the carbon chain length for preferred chlorinated paraffins may range from about C-16 to about C-26, most preferably, about C-18 to about C-24. An example of preferred paraffins are CHLOREZ® paraffins distributed by Dover Chemical Corporation of Dover, Ohio, due to their solubility.

Preferably, the monomer, or mixture of monomers, is blended with the antioxidant. The additive is then added. Notably, for solid chlorinated paraffins, the present inventors have found it necessary to heat the mixture to at least 120° F. to dissolve the chlorinated paraffin in the monomer. Thereafter, the photoinitiator is added to the mixture and the mixture is appropriately cured to polymerize the formulation.

The following table represents comparative test results of the product of the present invention (ACT-OGR) which, as described above provides both OPV and oil and grease resistant properties, and a prior art fluorine-containing composition (below collectively referred to as "FC"), specifically, FC-845 and FC-806, each distributed by 3M of Minneapolis, Minn., which is doubly treated with a traditional OPV product, namely the Actinic, Inc., OPV product noted hereinabove ACT-75A.

The substrate is a 41# clay-coated kraft paper. The test performed is known in the art as the RP2 Grease Test, wherein chicken broth is centrifuged for approximately five (5) minutes at about 10,000 RPM/g. The top layer was aspirated and transferred to a beaker. Sheets of graphed NALGENE™ coated POLYPAPER™ plastic paper were cut into 10×10 sheets. Similar 10×10 sheets of each ACT75A+ and FC treated paper were then cut. The sheets of treated paper were folded horizontally, opened, folded vertically, and then opened. Each sheet of treated paper was placed upon a sheet of the 10×10 graph paper. Then, flat sheets of treated paper are also placed upon 10×10 graph paper sheets for comparison testing of folded vs. flat sheets. Five (5) grams of OTTAWA™ cement sand is placed upon each paper stack, keeping the sand centralized. One (1) ml of the centrifuged chicken grease is pipetted directly onto the sand. Each sample was covered and placed within an approximate 140° F. oven for about 24 hours. Then, each sample was dismantled to check for penetration of the grease. Every grease-stained block on the graph paper represents a percent of failure (% Failure).

TABLE 1

| SAMPLE | % FAILURE |
| --- | --- |
| FC Folded | 7 |
| FC Folded | 10 |
| FC Flat | 12 |
| FC Flat | 10 |
| ACT-OGR Folded | 10 |
| ACT-OGR Folded | 11 |
| ACT-OGR Flat | 9 |
| ACT-OGR Flat | 8 |

As shown, paper treated with the present invention (ACT-OGR) provides for substantially similar, if not better, oil and grease resistance as compared to the prior art fluorine-containing coating. Notably, the ACT-OGR was applied though a single coating process, while the FC product required a pre-coating with the OPV followed by a coating with the FC composition.

A further sampling identified the following grease resistant properties for the coating of the present invention, namely, ACT-OGR:

| Sample | % Failure Folded (average for 2 samples) | % Failure Flat (average for 2 samples) |
| --- | --- | --- |
| #1 ACT-OGR on treated paper | 0.50 | 0.00 |
| #2a ACT-OGR on treated paper | 0.50 | 0.00 |
| #2b ACT-OGR on treated paper | 0.00 | 0.00 |
| #3 ACT-OGR on untreated paper | 0.50 | 0.25 |
| #4 ACT-OGR on untreated paper | 0.00 | 0.25 |
| #5a ACT-OGR applied to inner surface untreated paper | 0.50 | 0.00 |
| #5b ACT-OGR applied to inner surface untreated paper | 0.50 | 2.00 |

Although specific embodiments of the present invention have been illustrated and described in detail, it is to be expressly understood that the invention is not limited thereto. The above detailed description of the embodiment is provided for example only and should not be construed as constituting any limitation of the invention. Modifications will be obvious to those skilled in the art, and all modifications that do not depart from the spirit of the invention are intended to be included within the scope of the appended claims.

What is claimed is:

1. A pet food bag comprising:
   a. an outer-layer formed of a paper substrate wherein said paper substrate is treated with a varnish composition;
   b. the varnish composition consisting essentially of:
      i. a radiation sensitive monomer selected from the group consisting of acrylic esters, methacrylic esters, acrylic amides, and methacrylic amides in amounts from about 20%–90% by weight;
      ii. a non-fluorinated chlorinated paraffin additive present in amounts from about 5%–40% by weight and solubilized in the composition; and
      iii. a photoinitiator present in amounts from about 1%–20% by weight.

2. The pet food bag of claim 1 wherein the chlorinated paraffin has a molecular weight in the range of about 350 amu to about 1,200 amu.

3. The pet food bag of claim 1 wherein the chlorinated paraffin has a carbon chain length of between 16 and 26.

4. The pet food bag of claim 1 wherein the varnish and additive mixture has a viscosity of about 20 to about 1,000 cP.

5. The pet food bag of claim 1 wherein the varnish is an overprint varnish.

6. A pet food bag comprising:
   a. an inner paper substrate layer;
   b. an outer paper substrate layer;
   c. a middle paper substrate layer between the inner and outer layers; and
   d. a coating applied to at least the outer layer, the consisting essentially of:
      i. a radiation sensitive monomer selected from the group consisting of acrylic esters, methacrylic esters, acrylic amides, and methacrylic amides in amounts from about 20%–90% by weight;
      ii. a non-fluorinated, chlorinated paraffin additive present in amounts from about 5%–40% by weight and solubalized in compositions;
      iii. a photoinitiator present in amounts from about 1%–20% by weight.

7. The pet food bag of claim 6 wherein the coating is an overprint varnish.

* * * * *

UNITED STATES PATENT AND TRADEMARK OFFICE
CERTIFICATE OF CORRECTION

PATENT NO.     : 6,746,736 B2                                                    Page 1 of 1
DATED          : June 8, 2004
INVENTOR(S)    : Timothy Jon Leeper and Joy Michelle Thomas It is certified that error appears in the above-identified patent and that said Letters Patent is hereby corrected as shown below:

<u>Column 7,</u>
Line 12, the word -- coating -- should be included before the word "consisting".

Signed and Sealed this

Thirty-first Day of August, 2004

JON W. DUDAS
*Director of the United States Patent and Trademark Office*